(12) United States Patent
Pollard

(10) Patent No.: US 11,396,169 B1
(45) Date of Patent: Jul. 26, 2022

(54) CARGO LINER

(71) Applicant: Damarius Pollard, Tappahannock, VA (US)

(72) Inventor: Damarius Pollard, Tappahannock, VA (US)

( * ) Notice: Subject to any disclaimer, the term of this patent is extended or adjusted under 35 U.S.C. 154(b) by 269 days.

(21) Appl. No.: 16/872,451

(22) Filed: May 12, 2020

(51) Int. Cl.
| | |
|---|---|
| *B32B 27/34* | (2006.01) |
| *B60R 13/01* | (2006.01) |
| *B32B 27/28* | (2006.01) |
| *B32B 27/30* | (2006.01) |
| *B60J 11/06* | (2006.01) |
| *B32B 27/36* | (2006.01) |
| *B32B 27/08* | (2006.01) |
| *B32B 27/32* | (2006.01) |
| *B32B 1/02* | (2006.01) |

(52) U.S. Cl.
CPC ............. *B32B 27/34* (2013.01); *B32B 27/08* (2013.01); *B32B 27/283* (2013.01); *B32B 27/285* (2013.01); *B32B 27/304* (2013.01); *B32B 27/322* (2013.01); *B32B 27/36* (2013.01); *B60J 11/06* (2013.01); *B60R 13/01* (2013.01); *B32B 1/02* (2013.01); *B32B 2250/24* (2013.01); *B32B 2305/72* (2013.01); *B32B 2307/306* (2013.01); *B32B 2307/54* (2013.01); *B32B 2307/584* (2013.01); *B32B 2307/714* (2013.01); *B32B 2307/73* (2013.01); *B32B 2307/746* (2013.01); *B32B 2439/00* (2013.01); *B32B 2605/00* (2013.01)

(58) Field of Classification Search
CPC . B32B 27/08; B32B 2605/00; B32B 2439/00; B32B 2307/73; B32B 2250/24; B32B 1/02; B32B 23/322; B60R 13/01

USPC ....................................................... 269/39.2
See application file for complete search history.

(56) References Cited

U.S. PATENT DOCUMENTS

| 3,881,768 | A | 5/1975 | Nix |
| 4,893,862 | A | 1/1990 | Hollenbaugh, Sr. |
| D368,887 | S | 4/1996 | Upshaw |
| 6,129,409 | A | 10/2000 | D'Amico |
| 8,276,967 | B1 | 10/2012 | Ming-Shun |
| 1,005,405 | A1 | 6/2018 | McDonald, Jr. |
| 2013/0323004 | A1* | 12/2013 | Bemis ................. B60P 1/00 414/800 |
| 2017/0174148 | A1 | 6/2017 | Fujan |

FOREIGN PATENT DOCUMENTS

WO     2016176407     11/2016

* cited by examiner

*Primary Examiner* — Ellen S Hock
(74) *Attorney, Agent, or Firm* — Kyle A. Fletcher, Esq.

(57) ABSTRACT

The cargo liner is configured for use with a cargo carrying vehicle. The cargo liner is a protective structure that covers the supporting surface of the cargo carrying vehicle that supports the cargo. The cargo liner forms a protective barrier that prevents the cargo from damaging the supporting surface. The protective barrier formed by the cargo liner transfers the load of the cargo to the supporting surface of the cargo carrying vehicle that supports the cargo. The cargo liner is formed from a composite material. The cargo liner is temperature resistant. By temperature resistant is meant that has a melting point greater than 500 F (260 C). The composite material that forms the cargo liner has a structure selected from the group consisting of: a) a base structure; b) a flexible structure; and, c) a panel structure.

19 Claims, 7 Drawing Sheets

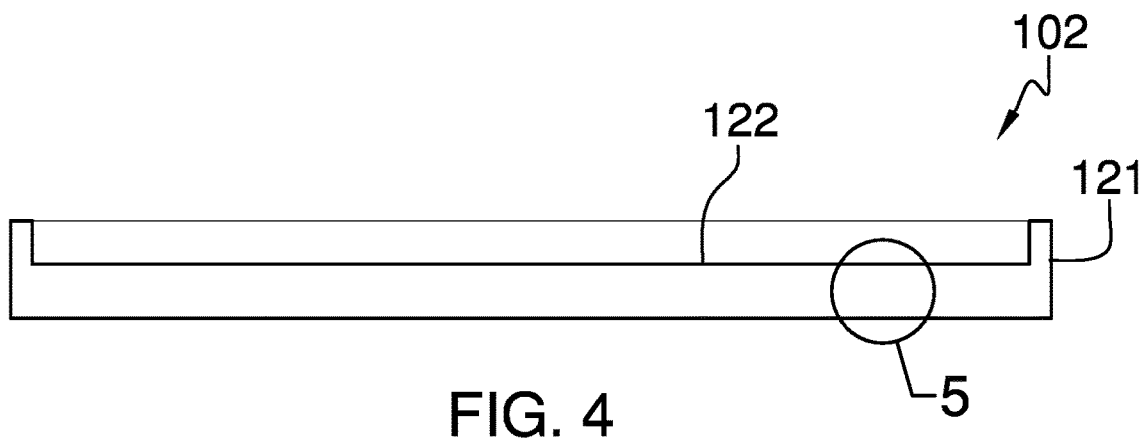
FIG. 4
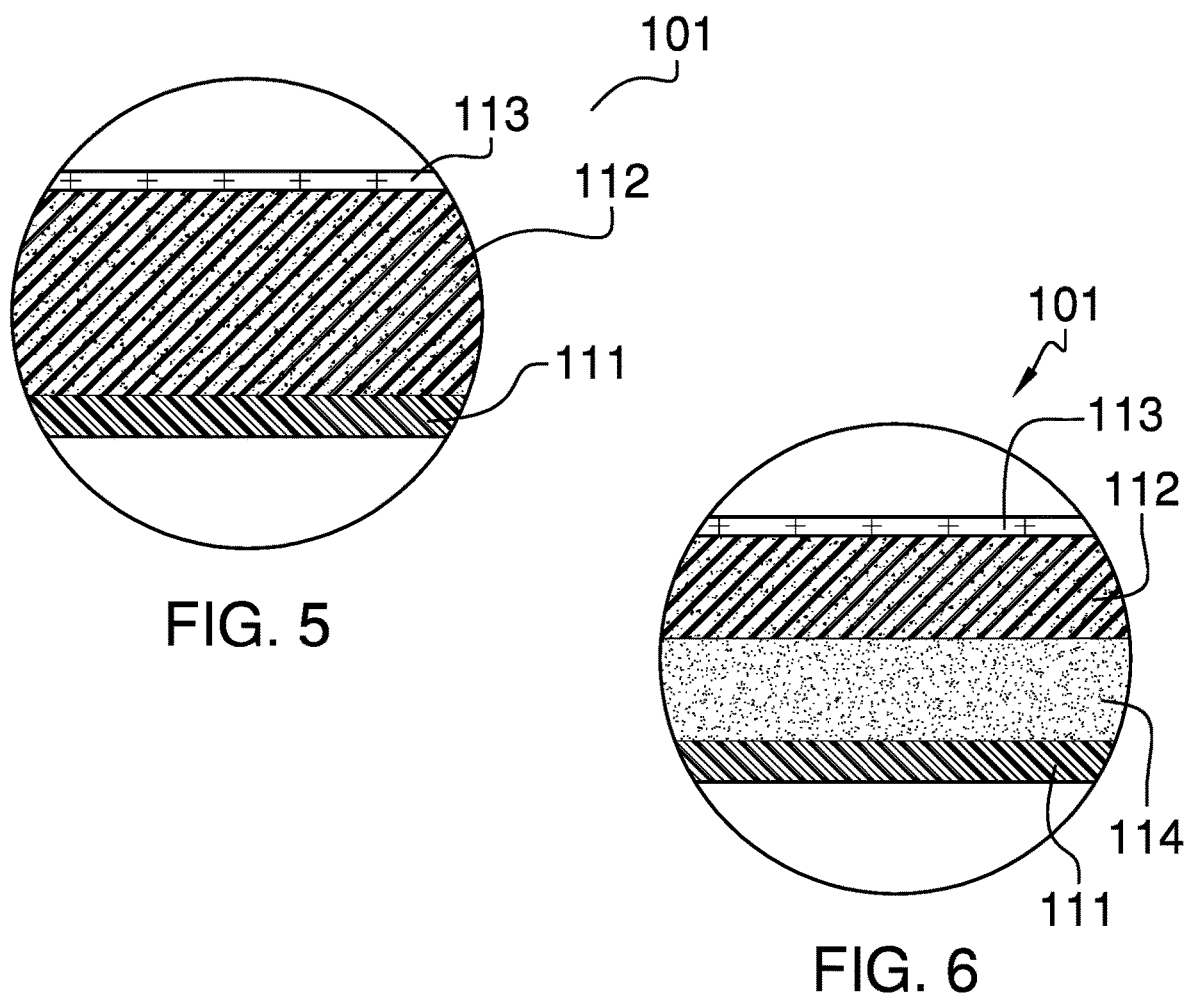
FIG. 5
FIG. 6

CARGO LINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including body finishing elements, more specifically, a liner for load platforms or load compartments. (B60R13/01)

SUMMARY OF INVENTION

The cargo liner is configured for use with a cargo carrying vehicle. The cargo liner is a protective structure that covers the supporting surface of the cargo carrying vehicle that supports the cargo. The cargo liner forms a protective barrier that prevents the cargo from damaging the supporting surface. The protective barrier formed by the cargo liner transfers the load of the cargo to the supporting surface of the cargo carrying vehicle that supports the cargo. The cargo liner is formed from a composite material. The cargo liner is temperature resistant. By temperature resistant is meant that the composite material has a melting point greater than 500 F (260 C).

The composite material that forms the cargo liner has a structure selected from the group consisting of: a) a base structure; b) a flexible structure; and, c) a panel structure. The composite material forms base structure into a pan that sits on the supporting surface of the cargo carrying vehicle that carries the cargo. The composite material forms the flexible structure into a sheeting that: a) is stored in anticipation for use; b) deployed as needed onto the supporting surface of the cargo carrying vehicle that carries the cargo; and, c) is retracted after its use onto a spool. The composite material forms the folding structure into a structure that minimizes the footprint of the cargo liner for storage on the supporting surface of the cargo carrying vehicle that carries the cargo when the cargo liner is not in use.

These together with additional objects, features and advantages of the cargo liner will be readily apparent to those of ordinary skill in the art upon reading the following detailed description of the presently preferred, but nonetheless illustrative, embodiments when taken in conjunction with the accompanying drawings.

In this respect, before explaining the current embodiments of the cargo liner in detail, it is to be understood that the cargo liner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cargo liner.

It is therefore important that the claims be regarded as including such equivalent construction insofar as they do not depart from the spirit and scope of the cargo liner. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a rear view of an embodiment of the disclosure.

FIG. 5 is a detail view of an embodiment of the disclosure.

FIG. 6 is a detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
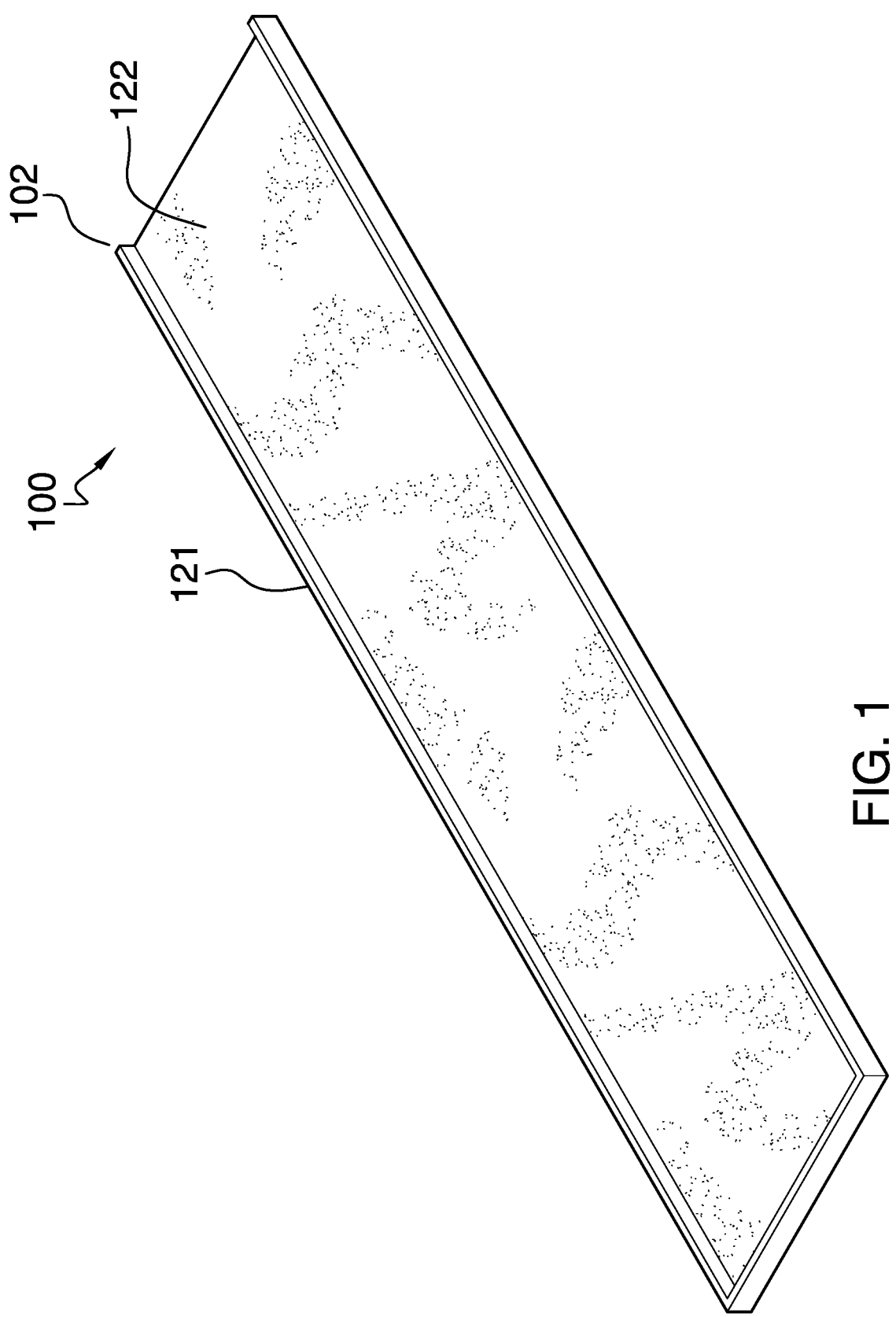
FIG. 1 is a perspective view of an embodiment of the disclosure.
Figure 2:
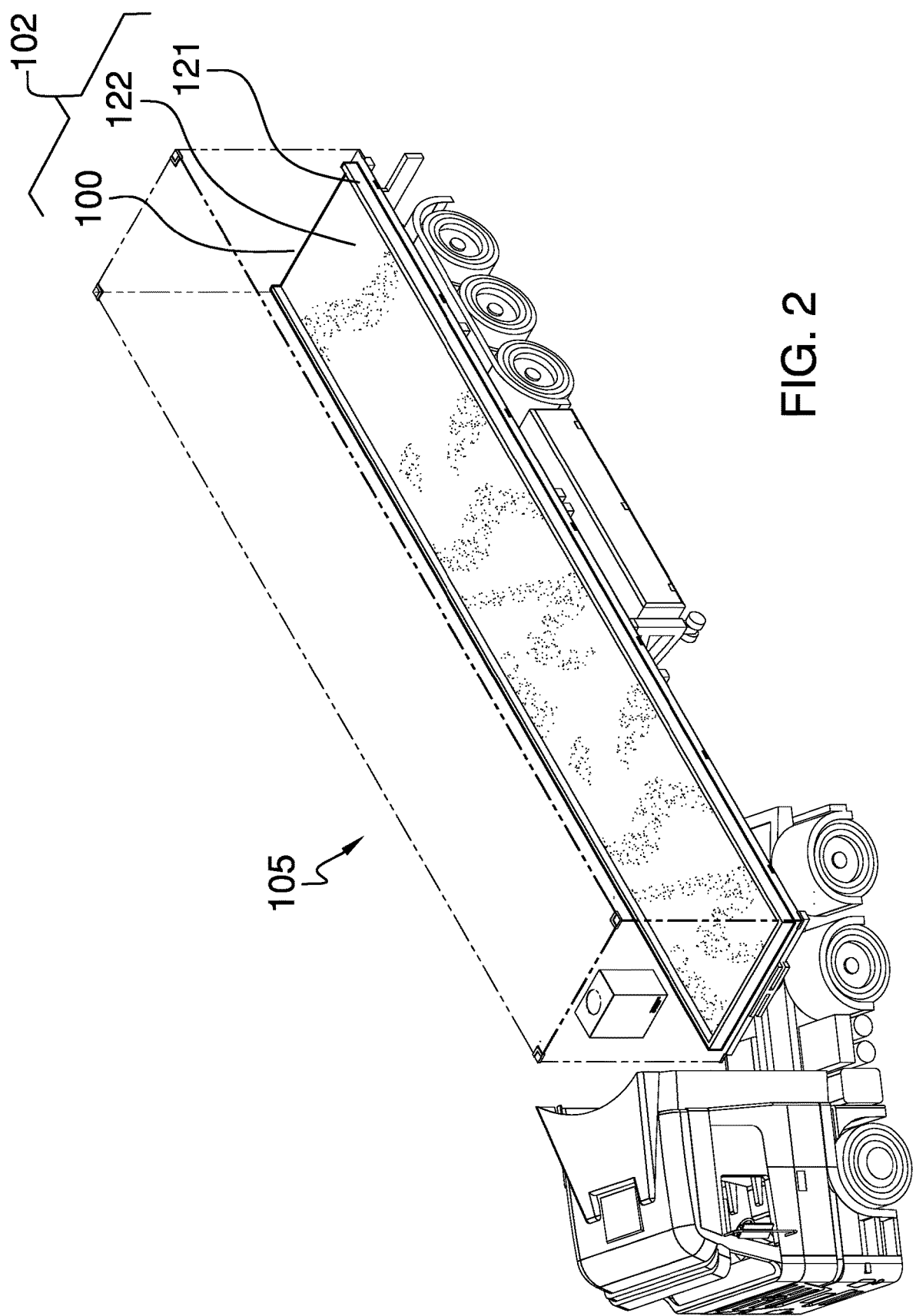
FIG. 2 is an in-use view of an embodiment of the disclosure.
Figure 3:
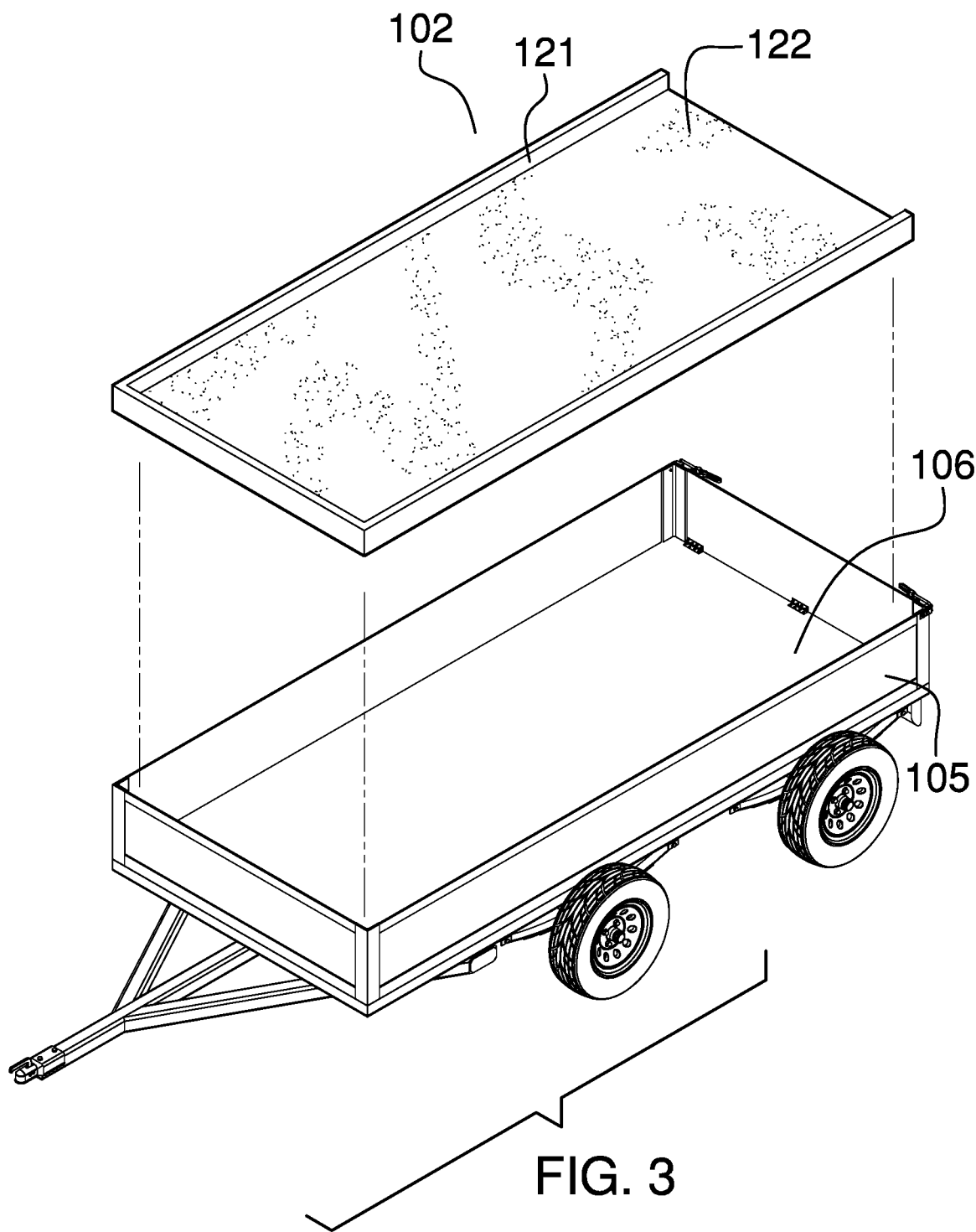
FIG. 3 is an in-use view of an embodiment of the disclosure.
Figure 7:
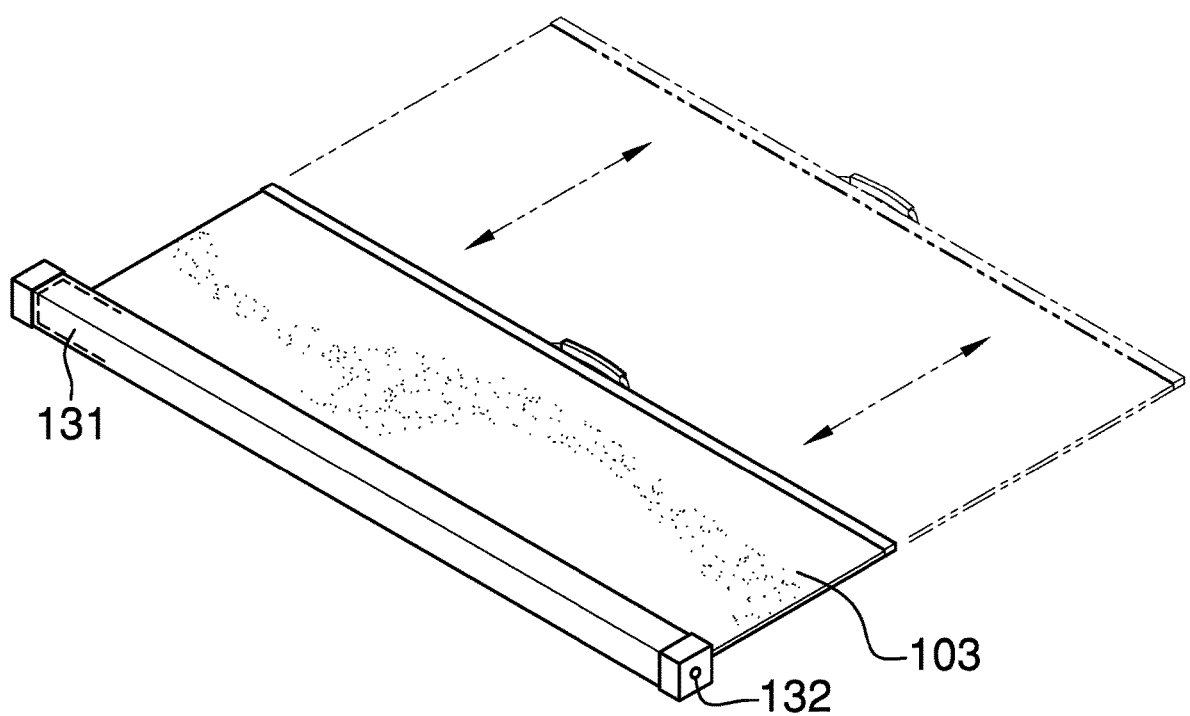
FIG. 7 is a perspective view of an embodiment of the disclosure.
Figure 8:
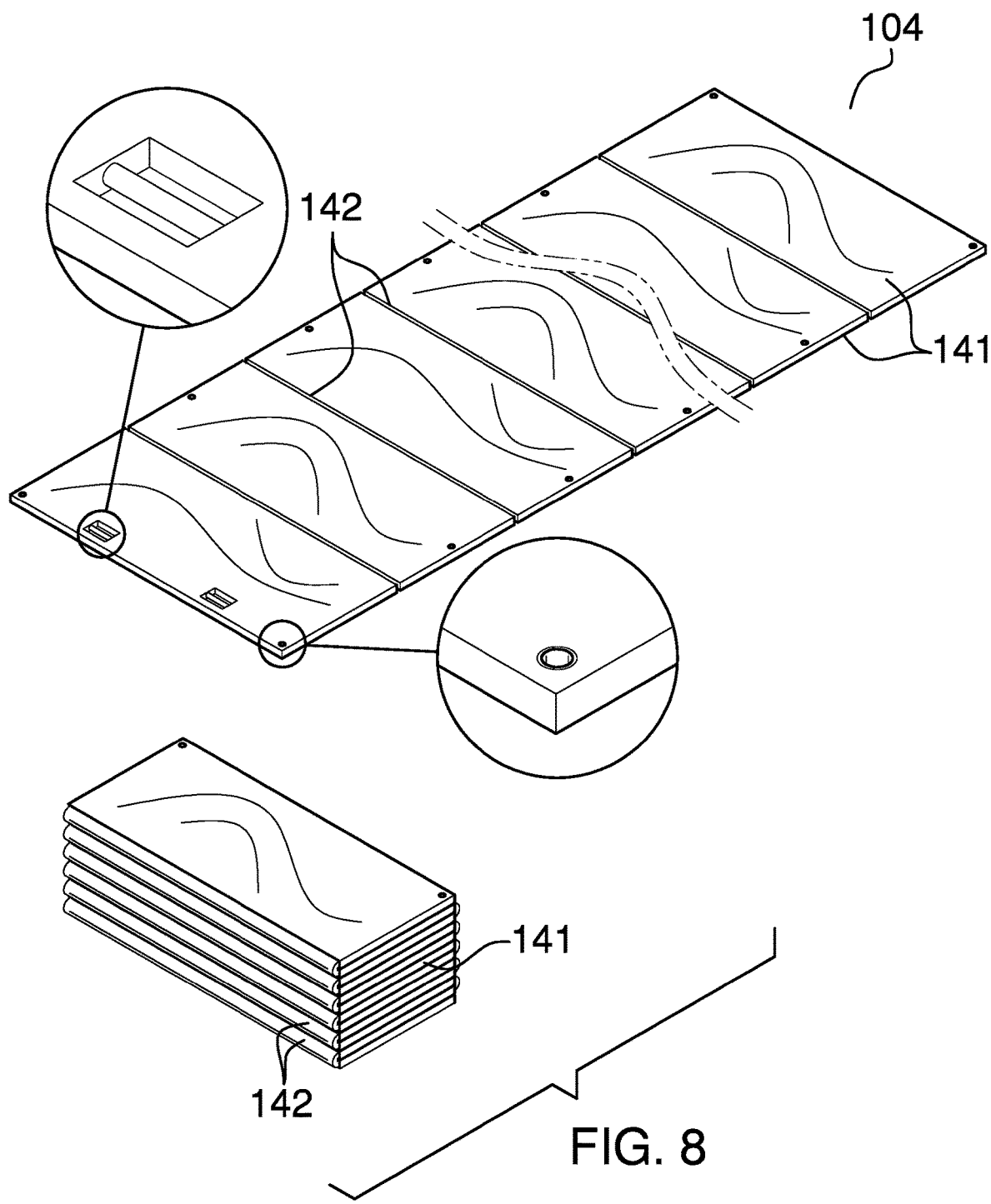
FIG. 8 is a perspective view of an embodiment of the disclosure.
Figure 9:
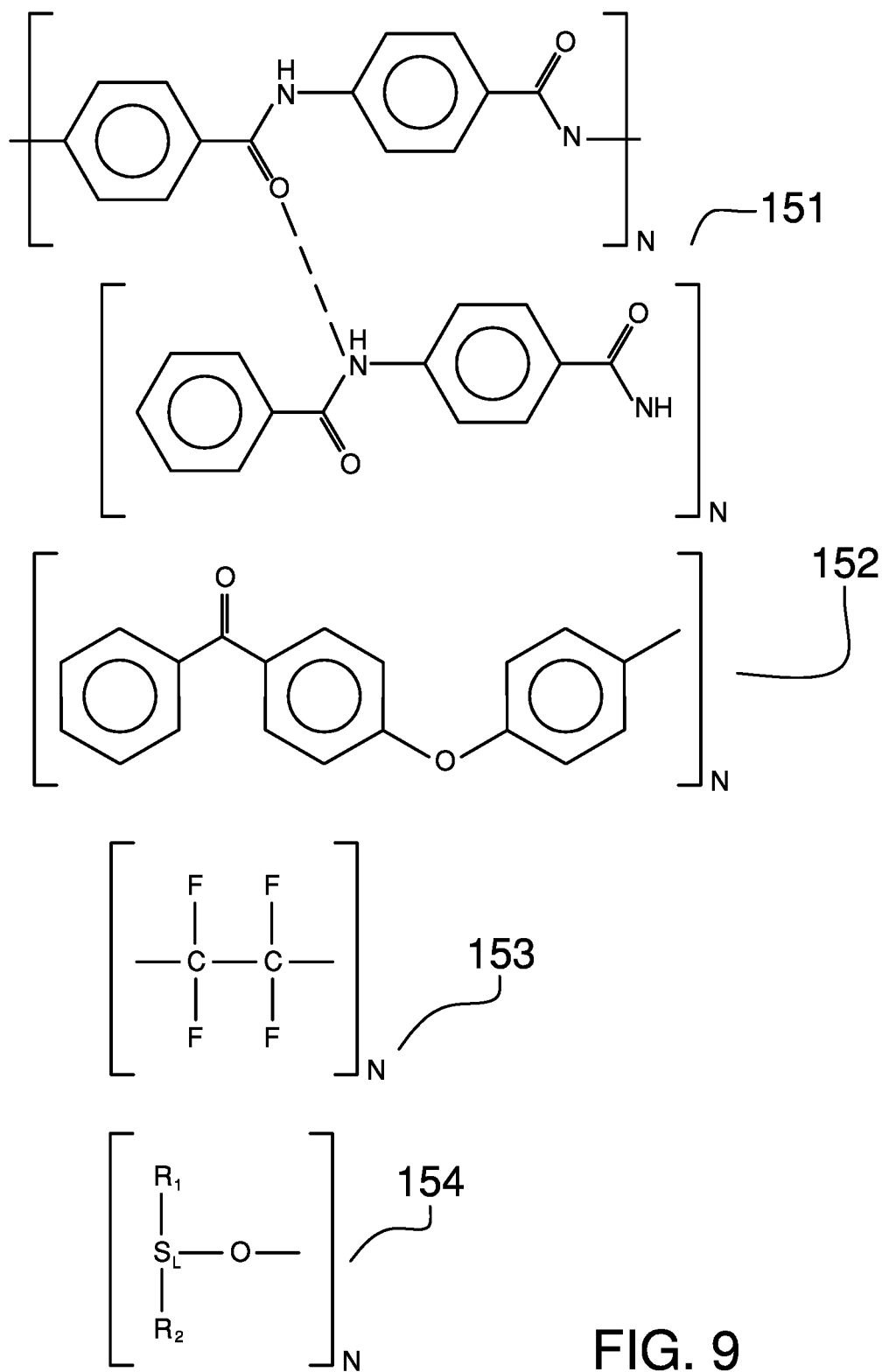
FIG. 9 is a detail view of an embodiment of the disclosure.

Detailed reference will now be made to one or more potential embodiments of the disclosure, which are illustrated in FIGS. 1 through 9.

The cargo liner 100 (hereinafter invention) is configured for use with a cargo carrying vehicle 105. The invention 100 is a protective structure that covers the supporting surface 106 of the cargo carrying vehicle 105 that supports the cargo. The invention 100 forms a protective barrier that prevents the cargo from damaging the supporting surface 106. The protective barrier formed by the invention 100 transfers the load of the cargo to the supporting surface 106 of the cargo carrying vehicle 105 that supports the cargo.

The invention 100 is formed from a composite material 101. In the first potential embodiment of the disclosure, the invention 100 is temperature resistant. By temperature resistant is meant that has a melting point greater than 500 F (260 C). The terms vehicle and supporting surface 106 are defined elsewhere in this disclosure.

The composite material 101 that forms the invention 100 has a structure selected from the group consisting of: a) a base structure 102; b) a flexible structure 103; and, c) a panel structure. The composite material 101 forms the base structure 102 as a pan that sits on the supporting surface 106 of the cargo carrying vehicle 105 that carries the cargo. The composite material 101 forms the flexible structure 103 as a sheeting that: a) is stored in anticipation for use; b) deployed as needed onto the supporting the supporting surface 106 of the cargo carrying vehicle 105 that carries the cargo; and, c) is retracted after its use onto a spool. The composite material 101 forms the folding structure 104 forms as structure that minimizes the footprint of the invention 100 for storage on the supporting surface 106 of the cargo carrying vehicle 105 that carries the cargo when the invention 100 is not in use.

The invention 100 comprises a composite material 101. The composite material 101 is formed into a structure selected from the group consisting of a base structure 102, a flexible structure 103, and a folding structure 104.

The composite material 101 is a layered composite structure. The composite material 101 is a polymer based structure. The composite material 101 is the structural material used to form the selected mechanical structure of the invention 100. The composite material 101 is formed from polymer based material. The composite material 101 is formed from temperature resistant polymers. By temperature resistant is meant that the melting point of each layer that forms the composite material 101 is greater than 500 F (260 C). The composite material 101 comprises a pedestal layer 111, a load bearing layer 112, and an abrasion resistant layer 113.

The pedestal layer 111 is the polymer layer of the composite material 101 that rests directly on the supporting surface 106 of the cargo carrying vehicle 105 that supports the cargo. The pedestal layer 111 is a high tensile strength polymer that is capable of absorbing energy without permanent deformation. The polymer structure of the pedestal layer 111 is highly crosslinked. In the first potential embodiment of the disclosure, the pedestal layer 111 is formed from poly-para-phenylene terephthalamide (CAS 25035-37-4) 151.

The load bearing layer 112 is the polymer layer of the composite material 101 that is sandwiched between the pedestal layer 111 and the abrasion resistant layer 113. The polymer structure of the load bearing layer 112 is selected to have a high tensile strength. The polymer structure of the load bearing layer 112 is selected to have a high chemical resistance. By high chemical resistance is meant that the load bearing layer 112 does not readily react with chemicals commonly transported as cargo. By high chemical resistance is further meant that the load bearing layer 112 does not readily decompose through biodegradation or photodegradation processes. In the first potential embodiment of the disclosure, the load bearing layer 112 is formed from poly (oxy-1,4-phenyleneoxy-1,4-phenylenecarbonyl-1,4-phenylene) (CAS 31694-16-3) 152.

The abrasion resistant layer 113 is the polymer layer of the composite material 101 that forms the surface on which the cargo carried by the cargo carrying vehicle 105 rests. The abrasion resistant layer 113 forms a water resistant surface. The surface presented by the abrasion resistant layer 113 is hydrophobic. The surface presented by the abrasion resistant layer 113 has a low coefficient of friction. The low coefficient of friction presented by the abrasion resistant layer 113 resists abrasion damage from both the carried cargo and the equipment used to load the cargo onto the cargo carrying vehicle 105. In the first potential embodiment of the disclosure, the abrasion resistant layer 113 is formed from polytetrafluoroethylene (CAS 9002-84-0) 153.

In a second potential embodiment of the disclosure, the composite material 101 is further formed with an elastomeric layer 114. The elastomeric layer 114 is a polymer layer of the composite material 101 that is sandwiched between the pedestal layer 111 and the load bearing layer 112. The elastomeric layer 114 is an elastomeric structure. The elastomeric layer 114 protects the composite material 101 by absorbing transient impact energy received by the composite material 101 during transport. The elastomeric layer 114 absorbs the transient impact energy by deforming under the forces generated by the transient impact energy and the returning to a relaxed shape. The elastomeric layer 114 is formed from a silicone 154 polymer.

The base structure 102 is a prism-shaped structure. The base structure 102 is formed as a semi-enclosed pan. The flexible structure 103 is a sheeting structure. The base structure 102 comprises a pan structure 121 and a supporting structure 122.

The pan structure 121 is a prism-shaped structure. The pan structure 121 has the shape of a pan. The pan structure 121 has the shape of a semi-enclosed pan. The pan structure 121 is formed by the pedestal layer 111 of the composite material 101 that forms the invention 100. The pan structure 121 is geometrically similar to the supporting surface 106 of the cargo carrying vehicle 105 that supports the cargo such that the pan structure 121 sits on the supporting surface 106. A portion of the lateral face of the pan structure 121 is removed to facilitate the loading and unloading of cargo on the cargo carrying vehicle 105.

The supporting structure 122 is formed from the layers of the composite material 101 that are distal from the supporting surface 106 of the cargo carrying vehicle 105 that supports the cargo. The supporting structure 122 forms the surface of the composite material 101 that supports the cargo.

The flexible structure 103 is stored as a roll 131. The flexible structure 103 is deployed for use onto the supporting surface 106 of the cargo carrying vehicle 105 that supports the cargo from the roll 131. The flexible structure 103 is retracted back onto the roll 131 after use. The flexible structure 103 comprises a roll 131 and a spool 132.

The roll 131 is a prism-shaped structure. The roll 131 contains the composite material 101 as a sheeting structure. By sheeting structure of the composite material 101 is meant that the pedestal layer 111 is formed as a flexible sheeting structure. By sheeting structure of the composite material 101 is meant that the load bearing layer 112 is formed as a flexible sheeting structure. By sheeting structure of the composite material 101 is meant that the abrasion resistant layer 113 is formed as a flexible sheeting structure. By sheeting structure of the composite material 101 is meant that the elastomeric layer 114 is formed as a flexible sheeting structure.

The spool 132 is a prism-shaped structure. The spool 132 is a rotating structure. The spool 132 rotates as the sheeting structure of the composite material 101 is removed from the roll 131 as it is deployed onto the supporting surface 106 of the cargo carrying vehicle 105 that supports the cargo. The spool 132 rotates as the sheeting structure of the composite material is loaded onto the roll 131 as it is retracted back onto the spool 132 from the supporting surface 106 of the cargo carrying vehicle 105 that supports the cargo.

The folding structure 104 forms a disk-shaped structure that deploys to protect the supporting surface 106. The folding structure 104 is subsequently folded into a prism-shaped structure after use. The prism-shaped structure of the folding structure 104 has a reduced storage footprint relative to the deployed configuration of the folding structure 104. The folding structure 104 comprises a plurality of plate structures and a plurality of living hinges 142.

Each of the plurality of plate structures 141 is a prism-shaped structure. Each of the plurality of plate structures 141 has a disk shape. Each of the plurality of plate structures 141 covers a portion of the supporting surface 106 of the cargo carrying vehicle 105 that supports the cargo. When deployed, the plurality of plate structures 141 is geometrically similar to the supporting surface 106 of the cargo carrying vehicle 105 that supports the cargo.

The plurality of living hinges 142 interconnect each of the plurality of plate structures 141 such that any first plate structure selected from the plurality of plate structures 141 rotates relative to a second plate structure selected from the plurality of plate structures 141. Each of the plurality of living hinges 142 is a flexure bearing that attaches a first plate structure selected from the plurality of plate structures 141 to a second plate structure selected from the plurality of plate structures 141 such that the first plate structure rotates relative to the second plate structure. The flexure bearing and the living hinge are defined elsewhere in this disclosure.

The following definitions were used in this disclosure:

Abrasion: As used in this disclosure, abrasion refers to the rubbing of a first object against a second object in a manner that generates friction.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Biodegradable, Degradable, and Photodegradable: As used in this disclosure, a material is degradable if the chemical composition of the material undergoes decomposition under the conditions of normal temperature and pressure. A material is biodegradable if the chemical composition of the material undergoes decomposition by the action of microorganisms. A material is photodegradable if the chemical composition of the material undergoes decomposition when exposed to light. In the vernacular, the use of the term biodegradable often includes degradable and photodegradable materials.

Carbamate: As used in this disclosure, a carbamate is a functional group consisting of an O—(C=O)—N structure. Carbamate is informally referred to as urethane.

Cargo: As used in this disclosure, cargo refers to one or more objects that are intended to be transported using a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite: As used in this disclosure, composite refers to a two-dimensional or three-dimensional structure that that is formed from two or more distinctly identifiable sub-structures.

Composite Material: As used in this disclosure, a composite material is a multilayer structure made of two or more joined layers of sheeting materials and coatings.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Crosslink: As used in this disclosure, a crosslink refers to an atom, molecule, or hydrogen bond that attaches a first molecular chain to a second, parallel, molecular chain. Typically, the molecular chain will be a polymer.

Damage: As used in this disclosure, damage refers to an action or activity that occurs to an object that: a) reduces or inhibits the intended function or normal operation of the object; or, b) reduces the value of the object. The object is referred to as the damaged object. The term injury is used to describe damage to a living object.

Decomposition: As used in this disclosure, decomposition refers to a chemical process comprising the separation of a molecule of a given atomic mass into two or more molecules or elements, each of lesser atomic mass than the original molecule. Unless stated otherwise in this disclosure, this definition excludes the radioactive processes such as radioactive decay.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Flexible: As used in this disclosure, flexible refers to an object or material that will deform when a force is applied to it but that will not necessarily return to its original shape when the deforming force is removed.

Flexure Bearing: As used in this disclosure, a flexure bearing is a thin and flexible material that is used to attach, or bind, a first object to a second object such that the first object can rotate in a controlled direction relative to the second object.

Foam: As used in this disclosure, foam is a mass of gas filled spaces, commonly referred to as bubbles, which can be formed: 1) on or in a liquid or gel; or, 2) in a solid material.

Fold: As used in this disclosure, to fold means to bend an object back upon itself.

Footprint: As used in this disclosure, a footprint is the measure of the surface area of a supporting surface that is occupied by an object.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Lateral Disk Structure: As used in this disclosure, a lateral plate structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Layer: As used in this disclosure, a layer is a disk-shaped structure that has a roughly consistent thickness as measured in the direction that is perpendicular to the congruent ends of the disk structure. The terms layered and layering refers to a plurality of layers that are stacked.

Living Hinge: As used in this disclosure, refers to a single object that is formed out of elastomeric material that is divided into a first segment, a second segment and the living hinge. The elastic nature of the elastomeric material allow the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Monomer: As used in this disclosure, a monomer refers to a molecular structure that bonds to itself in a repeating manner to form a polymer.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Polymer: As used in this disclosure, a polymer refers to a molecular chain that comprises multiple repeating units known as monomers. The repeating unit may be an atom or a molecular structure.

Polyurethane: As used in this disclosure, a polyurethane is a copolymer wherein the one or more monomer chains are linked together carbamates.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protective Barrier: As used in this disclosure, a protected barrier is a boundary structure. The boundary structure forms a barrier that separates a first object from a second object such that the second object cannot damage the first object.

Relaxed Shape: As used in this disclosure, a structure is considered to be in its relaxed state when no shear, strain, or torsional forces are being applied to the structure.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Silicone: As used in this disclosure, silicone is a substance formed from silicon (Si) and oxygen (O) that forms the backbone of polymer type chains similar to polymers that are formed by carbon. Though exceptions do exist, silicone is generally considered to be less reactive and to have better heat resistance when compared to most common carbon based polymers.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Vernacular: As used in this disclosure, the vernacular is a noun that refers to the common meaning and usage of a word as opposed to a specialized or more specific meaning and usage of the same word by a person skilled in an art.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A cargo liner comprising
a composite material;
wherein the cargo liner is configured for use with a cargo carrying vehicle;
wherein the cargo liner is a protective structure that covers the supporting surface of the cargo carrying vehicle that supports the cargo;
wherein the cargo liner forms a protective barrier that prevents the cargo from damaging the supporting surface;
wherein the protective barrier formed by the cargo liner transfers the load of the cargo to the supporting surface of the cargo carrying vehicle that supports the cargo;
wherein the composite material that forms the cargo liner has a structure selected from the group consisting of: a) a base structure; b) a flexible structure; and, c) a panel structure;
wherein the composite material forms the base structure into a pan that sits on the supporting surface of the cargo carrying vehicle that carries the cargo;
wherein the composite material forms the flexible structure a sheeting that: a) is stored in anticipation for use: b) deployed as needed onto the supporting surface of the cargo carrying vehicle that carries the cargo; and, c) is retracted after its use onto a spool;
wherein the composite material forms the folding structure into a folding that minimizes the footprint of the cargo liner.

2. The cargo liner according to claim 1
wherein the cargo liner is temperature resistant;
wherein by temperature resistant is meant that has a melting point greater than 500 F (260 C).

3. The cargo liner according to claim 2 wherein the composite material is a layered composite structure.

4. The cargo liner according to claim 3 wherein the composite material is a polymer based structure.

5. The cargo liner according to claim 4
wherein the composite material is formed from temperature resistant polymers;
wherein by temperature resistant is meant that the melting point of each layer that forms the composite material is greater than 500 F (260 C).

6. The cargo liner according to claim 5
wherein the composite material comprises a pedestal layer, a load bearing layer, and an abrasion resistant layer;
wherein the load bearing layer is the polymer layer of the composite material that is sandwiched between the pedestal layer and the abrasion resistant layer.

7. The cargo liner according to claim 6
wherein the pedestal layer is a high tensile strength polymer that is capable of absorbing energy without permanent deformation;
wherein the polymer structure of the pedestal layer is crosslinked.

8. The cargo liner according to claim 7
wherein the polymer structure of the load bearing layer is selected to have a high tensile strength;
wherein the polymer structure of the load bearing layer is selected to have a high chemical resistance;
wherein by high chemical resistance is meant that the load bearing layer does not readily react with chemicals commonly transported as cargo;
wherein by high chemical resistance is further meant that the load bearing layer does not readily decompose through biodegradation or photodegradation processes.

9. The cargo liner according to claim 8
wherein the surface presented by the abrasion resistant layer is hydrophobic;
wherein the surface presented by the abrasion resistant layer has a low coefficient of friction.

10. The cargo liner according to claim 9
wherein the pedestal layer is the polymer layer of the composite material that rests directly on the supporting surface of the cargo carrying vehicle that supports the cargo;
wherein the abrasion resistant layer is the polymer layer of the composite material that forms the surface on which the cargo carried by the cargo carrying vehicle rests.

11. The cargo liner according to claim 10
wherein the base structure is a prism-shaped structure;
wherein the base structure is formed as a semi-enclosed pan;
wherein the flexible structure is a sheeting structure;
wherein the base structure comprises a pan structure and a supporting structure;
wherein the pan structure is a prism-shaped structure;
wherein the pan structure has the shape of a pan;
wherein the pan structure has the shape of a semi-enclosed pan;
wherein the pan structure is formed by the pedestal layer of the composite material that forms the cargo liner;
wherein the pan structure is geometrically similar to the supporting surface of the cargo carrying vehicle that supports the cargo such that the pan structure sits on the supporting surface;
wherein a portion of the lateral face of the pan structure is removed to facilitate the loading and unloading of cargo on the cargo carrying vehicle;
wherein the supporting structure is formed from the layers of the composite material that are distal from the supporting surface of the cargo carrying vehicle that supports the cargo;
wherein the supporting structure forms the surface of the composite material that supports the cargo.

12. The cargo liner according to claim 11
wherein the flexible structure is stored as a roll;
wherein the flexible structure is deployed for use onto the supporting surface of the cargo carrying vehicle that supports the cargo from the roll;
wherein the flexible structure is retracted back onto the roll after use;
wherein the flexible structure comprises a roll and a spool;
wherein the roll is a prism-shaped structure;
wherein the roll contains the composite material as a sheeting structure;
wherein by sheeting structure of the composite material is meant that the pedestal layer is formed as a flexible sheeting structure;
wherein by sheeting structure of the composite material is meant that the load bearing layer is formed as a flexible sheeting structure;
wherein by sheeting structure of the composite material is meant that the abrasion resistant layer is formed as a flexible sheeting structure;
wherein by sheeting structure of the composite material is meant that the elastomeric layer is formed as a flexible sheeting structure;
wherein the spool is a prism-shaped structure;
wherein the spool is a rotating structure;
wherein the spool rotates as the sheeting structure of the composite material is removed from the roll as it is deployed onto the supporting surface of the cargo carrying vehicle that supports the cargo;
wherein the spool rotates as the sheeting structure of the composite material is loaded onto the roll as it is retracted back onto the spool from the supporting surface of the cargo carrying vehicle that supports the cargo.

13. The cargo liner according to claim 12
wherein the folding structure forms a disk-shaped structure that deploys to protect the supporting surface;
wherein the folding structure is subsequently folded into a prism-shaped structure after use;
wherein the prism-shaped structure of the folding structure has a reduced storage footprint relative to the deployed configuration of the folding structure;
wherein the folding structure comprises a plurality of plate structures and a plurality of living hinges;
wherein each of the plurality of plate structures is a prism-shaped structure;
wherein each of the plurality of plate structures has a disk shape;
wherein each of the plurality of plate structures covers a portion of the supporting surface of the cargo carrying vehicle that supports the cargo;
wherein when deployed, the plurality of plate structures is geometrically similar to the supporting surface of the cargo carrying vehicle that supports the cargo;
wherein the plurality of living hinges interconnect each of the plurality of plate structures such that any first plate structure selected from the plurality of plate structures rotates relative to a second plate structure selected from the plurality of plate structures;
wherein each of the plurality of living hinges is a flexure bearing that attaches a first plate structure selected from the plurality of plate structures to a second plate structure selected from the plurality of plate structures such that the first plate structure rotates relative to the second plate structure.

14. The cargo liner according to claim 13
wherein the pedestal layer is formed from poly-para-phenylene terephthalamide (CAS 25035-37-4);
wherein the load bearing layer is formed from poly(oxy-1,4-phenyleneoxy-1,4-phenylenecarbonyl-1,4-phenylene) (CAS 31694-16-3);
wherein the abrasion resistant layer is formed from polytetrafluoroethylene (CAS 9002-84-0).

15. The cargo liner according to claim 10
wherein the composite material is further formed with an elastomeric layer;
wherein the elastomeric layer is a polymer layer of the composite material that is sandwiched between the pedestal layer and the load bearing layer;
wherein the elastomeric layer is an elastomeric structure;
wherein the elastomeric layer protects the composite material by absorbing transient impact energy received by the composite material.

16. The cargo liner according to claim 15
wherein the base structure is a prism-shaped structure;
wherein the base structure is formed as a semi-enclosed pan;
wherein the flexible structure is a sheeting structure;
wherein the base structure comprises a pan structure and a supporting structure;
wherein the pan structure is a prism-shaped structure;
wherein the pan structure has the shape of a pan;
wherein the pan structure has the shape of a semi-enclosed pan;
wherein the pan structure is formed by the pedestal layer of the composite material that forms the cargo liner;
wherein the pan structure is geometrically similar to the supporting surface of the cargo carrying vehicle that supports the cargo such that the pan structure sits on the supporting surface;
wherein a portion of the lateral face of the pan structure is removed to facilitate the loading and unloading of cargo on the cargo carrying vehicle;
wherein the supporting structure is formed from the layers of the composite material that are distal from the supporting surface of the cargo carrying vehicle that supports the cargo;
wherein the supporting structure forms the surface of the composite material that supports the cargo.

17. The cargo liner according to claim 16
wherein the flexible structure is stored as a roll;
wherein the flexible structure is deployed for use onto the supporting surface of the cargo carrying vehicle that supports the cargo from the roll;
wherein the flexible structure is retracted back onto the roll after use;
wherein the flexible structure comprises a roll and a spool;
wherein the roll is a prism-shaped structure;
wherein the roll contains the composite material as a sheeting structure;
wherein by sheeting structure of the composite material is meant that the pedestal layer is formed as a flexible sheeting structure;
wherein by sheeting structure of the composite material is meant that the load bearing layer is formed as a flexible sheeting structure;
wherein by sheeting structure of the composite material is meant that the abrasion resistant layer is formed as a flexible sheeting structure;
wherein by sheeting structure of the composite material is meant that the elastomeric layer is formed as a flexible sheeting structure;
wherein the spool is a prism-shaped structure;
wherein the spool is a rotating structure;
wherein the spool rotates as the sheeting structure of the composite material is removed from the roll as it is deployed onto the supporting surface of the cargo carrying vehicle that supports the cargo;
wherein the spool rotates as the sheeting structure of the composite material is loaded onto the roll as it is retracted back onto the spool from the supporting surface of the cargo carrying vehicle that supports the cargo.

18. The cargo liner according to claim 17
wherein the folding structure forms a disk-shaped structure that deploys to protect the supporting surface;
wherein the folding structure is subsequently folded into a prism-shaped structure after use;
wherein the prism-shaped structure of the folding structure has a reduced storage footprint relative to the deployed configuration of the folding structure;
wherein the folding structure comprises a plurality of plate structures and a plurality of living hinges;
wherein each of the plurality of plate structures is a prism-shaped structure;
wherein each of the plurality of plate structures has a disk shape;
wherein each of the plurality of plate structures covers a portion of the supporting surface of the cargo carrying vehicle that supports the cargo;
wherein when deployed, the plurality of plate structures is geometrically similar to the supporting surface of the cargo carrying vehicle that supports the cargo;
wherein the plurality of living hinges interconnect each of the plurality of plate structures such that any first plate structure selected from the plurality of plate structures rotates relative to a second plate structure selected from the plurality of plate structures;
wherein each of the plurality of living hinges is a flexure bearing that attaches a first plate structure selected from the plurality of plate structures to a second plate structure selected from the plurality of plate structures such that the first plate structure rotates relative to the second plate structure.

19. The cargo liner according to claim 18
wherein the pedestal layer is formed from poly-para-phenylene terephthalamide (CAS 25035-37-4);
wherein the load bearing layer is formed from poly(oxy-1,4-phenyleneoxy-1,4-phenylenecarbonyl-1,4-phenylene) (CAS 31694-16-3);
wherein the abrasion resistant layer is formed from polytetrafluoroethylene (CAS 9002-84-0);
wherein the elastomeric layer is formed from a silicone polymer.

* * * * *